(12) United States Patent
Pankaj

(10) Patent No.: US 11,614,277 B2
(45) Date of Patent: Mar. 28, 2023

(54) MANAGEMENT SYSTEM AND MANAGEMENT PROGRAM

(71) Applicant: INNOVATION THRU ENERGY CO LTD., Tokyo (JP)

(72) Inventor: Garg Pankaj, Tokyo (JP)

(73) Assignee: INNOVATION THRU ENERGY CO LTD., Tokyo (JP)

( * ) Notice: Subject to any disclaimer, the term of this patent is extended or adjusted under 35 U.S.C. 154(b) by 169 days.

(21) Appl. No.: 16/320,035

(22) PCT Filed: May 27, 2016

(86) PCT No.: PCT/JP2016/065767
§ 371 (c)(1),
(2) Date: Jan. 23, 2019

(87) PCT Pub. No.: WO2017/203703
PCT Pub. Date: Nov. 30, 2017

(65) Prior Publication Data
US 2019/0257576 A1     Aug. 22, 2019

(51) Int. Cl.
*F25D 11/00*     (2006.01)
*F25D 29/00*     (2006.01)
(Continued)

(52) U.S. Cl.
CPC ........... *F25D 29/003* (2013.01); *B65G 1/137* (2013.01); *F25D 3/00* (2013.01); *F25D 11/003* (2013.01);
(Continued)

(58) Field of Classification Search
CPC ..... F25D 29/003; F25D 11/003; B65G 1/137; G06K 19/07; G06K 19/0717
See application file for complete search history.

(56) References Cited

U.S. PATENT DOCUMENTS 5,230,434 A * 7/1993 Patrick ..................... B60P 1/52
 206/596
5,305,615 A * 4/1994 McFadden .......... A47J 37/1228
 414/331.04
(Continued)

FOREIGN PATENT DOCUMENTS

JP   H11994445 A  * 9/1997
JP   11-94445 A    4/1999
(Continued)

OTHER PUBLICATIONS

Yoshino, Control method of cold insulation device and three-dimensional warehouse, 1997, Full Document (Year: 1997).*

*Primary Examiner* — Nael N Babaa
(74) *Attorney, Agent, or Firm* — BakerHostetler; Tayan B. Patel

(57) ABSTRACT

The present application is at least directed to a control system to cool cooled objects and to keep cooled objects cool without cooling an entire storage space for cooled objects. The control system includes containers, which hold cooled objects and a TES member to cool the cooled objects. The control system is configured to judge if it is time to replace the TES member based on a combination of cooled objects, stored in the containers to keep cool, and the TES member. The control system also is configured to notify if it is time to replace the TES member based upon the judging step.

9 Claims, 14 Drawing Sheets

(51) Int. Cl.
*B65G 1/137* (2006.01)
*F25D 3/00* (2006.01)
*G06K 19/07* (2006.01)

(52) U.S. Cl.
CPC ......... *G06K 19/07* (2013.01); *G06K 19/0717* (2013.01); *G06K 19/0723* (2013.01)

(56) References Cited

U.S. PATENT DOCUMENTS

| | | | |
|---|---|---|---|
| 6,308,518 B1* | 10/2001 | Hunter | G05D 16/0655 62/3.3 |
| 2008/0213073 A1* | 9/2008 | Benedict | B66C 7/12 414/279 |
| 2013/0174586 A1* | 7/2013 | Kang | F25D 29/00 62/56 |
| 2014/0055244 A1* | 2/2014 | Burchell | G06K 19/0717 340/10.1 |
| 2014/0157797 A1 | 6/2014 | Kovalick et al. | |

FOREIGN PATENT DOCUMENTS

| | | |
|---|---|---|
| JP | 2001-72210 A | 3/2001 |
| JP | 2003-185313 A | 7/2003 |
| JP | 2003-252404 A | 9/2003 |
| JP | 2015-147607 A | 8/2015 |
| WO | 2015-118692 A1 | 3/2017 |

* cited by examiner

MANAGEMENT SYSTEM AND MANAGEMENT PROGRAM

CROSS-REFERENCE TO RELATED APPLICATIONS

This application is a National Stage of International patent application no. PCT/JP2016/065767, filed on May 27, 2016, the disclosure of which is incorporated by reference in its entirety.

FIELD OF THE INVENTION

This invention is regarding control system and control program to control cooled objects, especially regarding control system and control program at warehouse where to cool and store cooled objects.

BACKGROUND

A warehouse to store cooled objects at refrigeration state or freezing state, as in the past, is known as an entire warehouse being a refrigeration facility or a freezing facility to keep low temperature.

And automatic warehouse, for refrigerating or freezing, installed with storage shelves and equipped with a stacker crane running along with these storage shelves also is known. (e.g., refer to patent document 1 and patent document 2)

If such an automatic warehouse for refrigeration or freezing was utilized, stacker crane would convey cooled objects, automatically store cooled objects on the storage shelves and automatically pick up cooled objects from storage shelves. Therefore, for instance, we could eliminate workers to unload box 15 in the severe environment of −25° C.

PATENT DOCUMENT

Patent Document 1

Unexamined patent application #2003-252404 public information

Patent Document 2

Unexamined patent application #2001-72210 public information

SUMMARY OF THE INVENTION

However, as in the past, conveyors or stacker cranes which run inside automatic warehouse for refrigeration or freezing intend to break down due to cold air in the warehouse. For instance, an electric motor that is a power source of conveyor or stacker crane may break down due to freezing or condensation. In this case, operation will be ceased until the conveyor or the stacker crane gets repaired or replaced. On top of it, it would cost to repair or replace a conveyor or a stacker crane.

And, because it is necessary to cool an entire automatic warehouse for refrigeration or freezing in the past, at constant temperature, consumption of electricity is great. Therefore, it would also increase cost. For instance, if number of cooled objects is few comparing to the size of their warehouse, it especially would be wasteful. Furthermore, it is necessary to keep cooling down cooled objects during a power failure, etc. Spare power supply, needs to be installed, so that it would be required to keep cooling a entire warehouse at constant temperature, even though it was during a power failure.

Thereat, the purpose of this invention to provide control system and control program to control in order to cool down and keep cooling cooled objects instead of cooling an entire storage space to cool cooled objects.

From the first point of view of this invention, this is a control system of containers, which hold cooled objects and TES member to cool said cooled objects, keeping cool. It provides control system featuring to equip judging method to judge time to replace said thermal energy storage, TES hereafter, has come or not based on combination of cooled objects, which was stored in the said containers to keep cool, and TES member and notifying method to notify time to replace TES member when said judging method judges time to replace TES member come.

From the second point of view of this invention, this invention is controlling program to function a computer as control system of keeping cool container to store cooled objects and TES member to cool said cooled objects, and said computer is control system of keeping cool container storing cooled objects and TES member said cooled objects, and provides control program to function Control system that equips judging method to judge if it is time to replace said TES member, based on combination of cooled objects and TES member that are stored in said keeping cool container, and notify method to notify time to replace said TES member due to said judging method if it was judged as time to replace a TES member.

This invention can provide control system and control program to cool cooled objects and to keep cooled objects cool without cooling an entire storage space.

BRIEF DESCRIPTION OF THE DRAWINGS

Drawing 1. Drawing shows basic configuration of automatic warehouse, which is subject to control in embodiment of this invention.

Drawing 2. Drawing shows basic configuration of containers and pallets in the embodiment of this invention.

Figure 1:
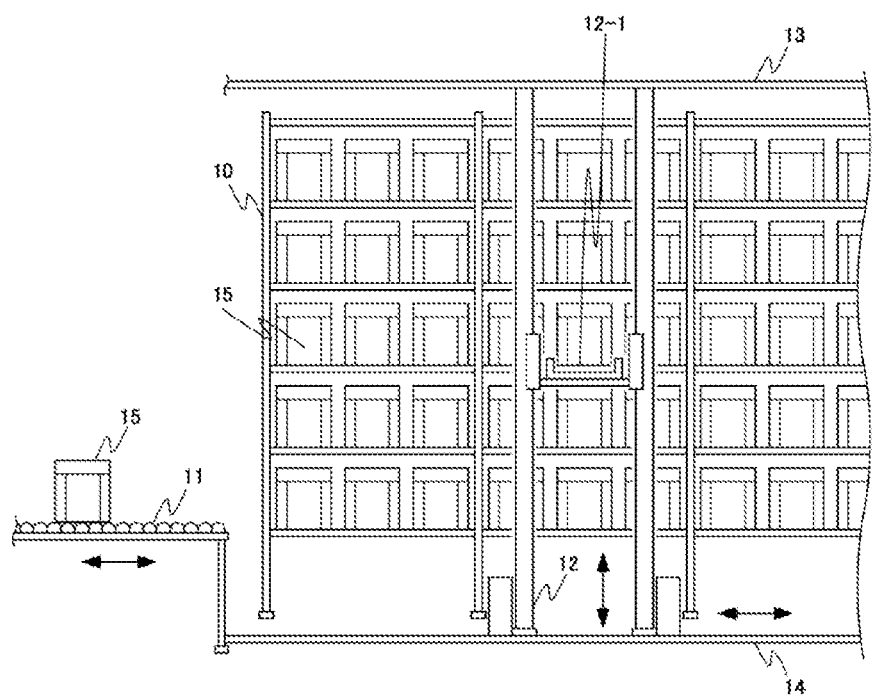
Figure 2:
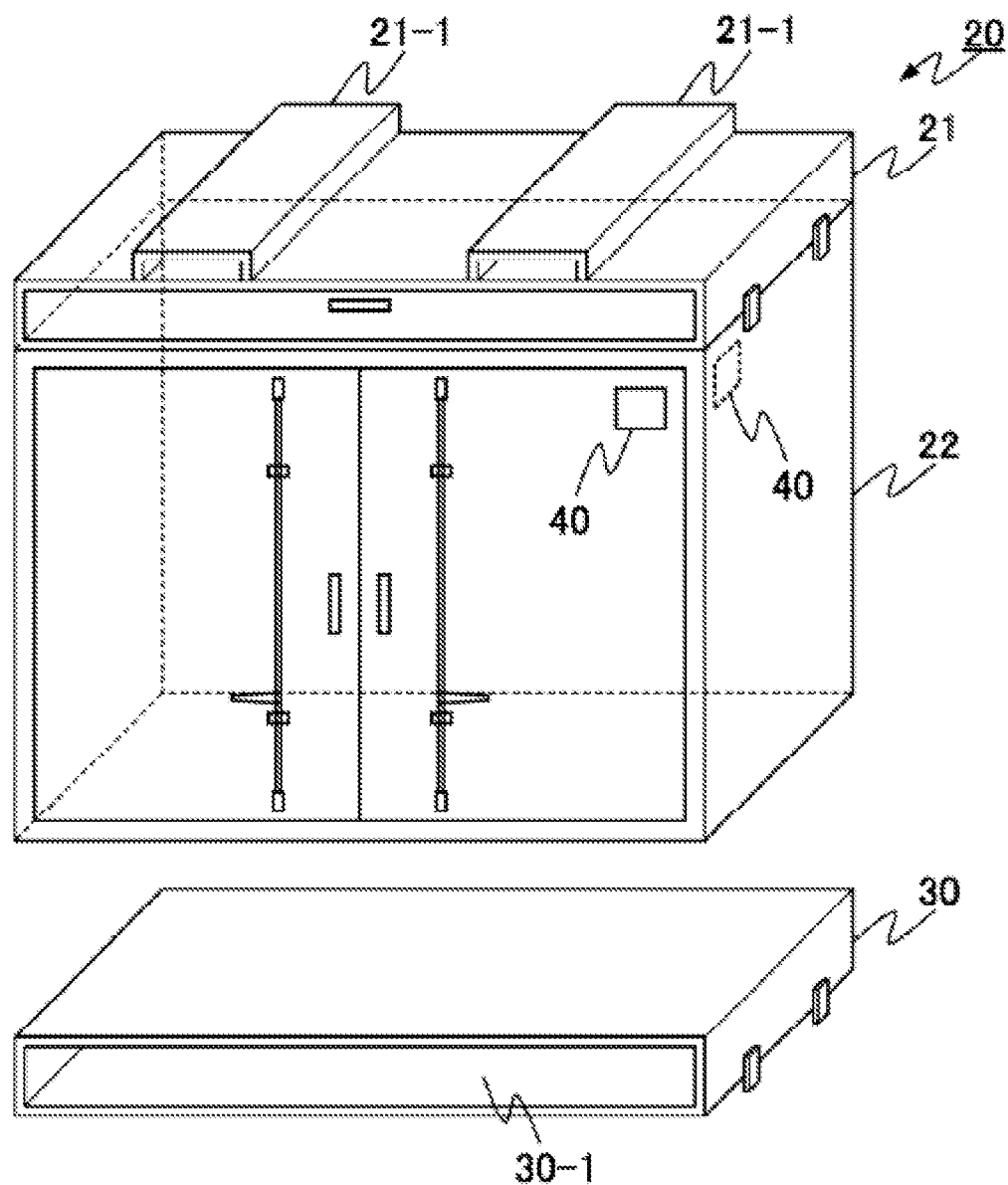
Figure 3:
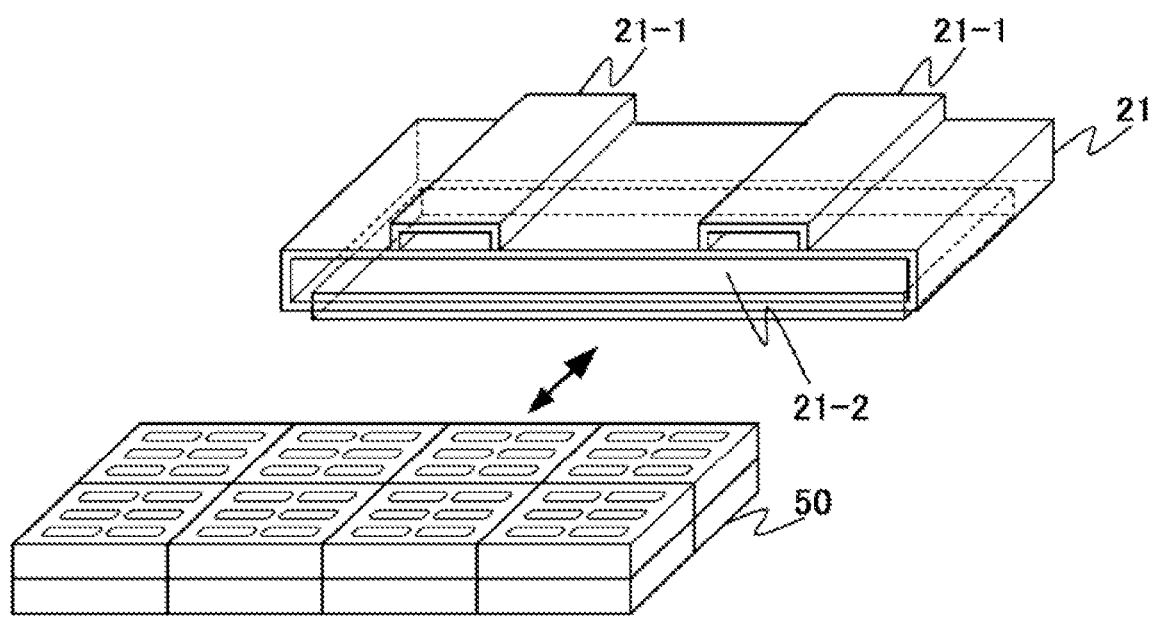
Figure 4:
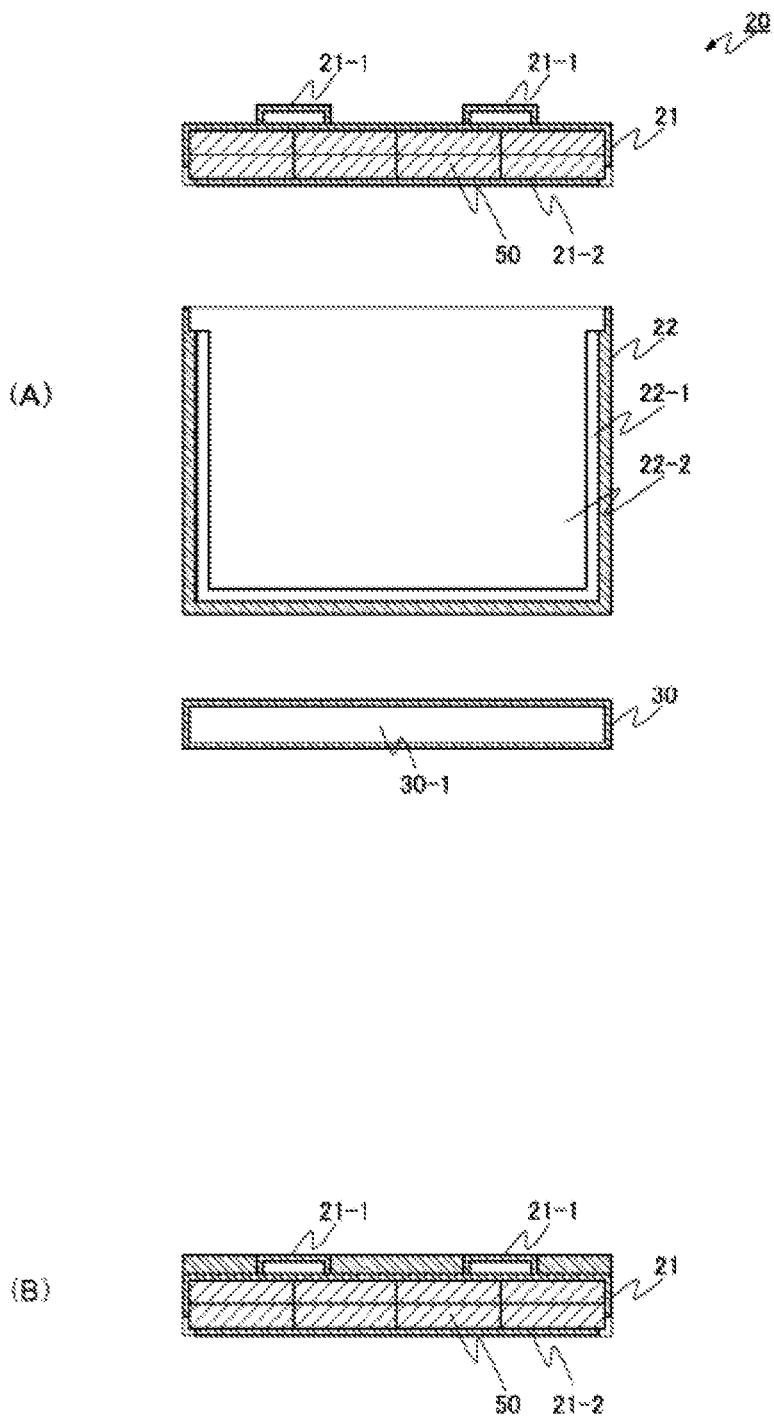
Figure 5:
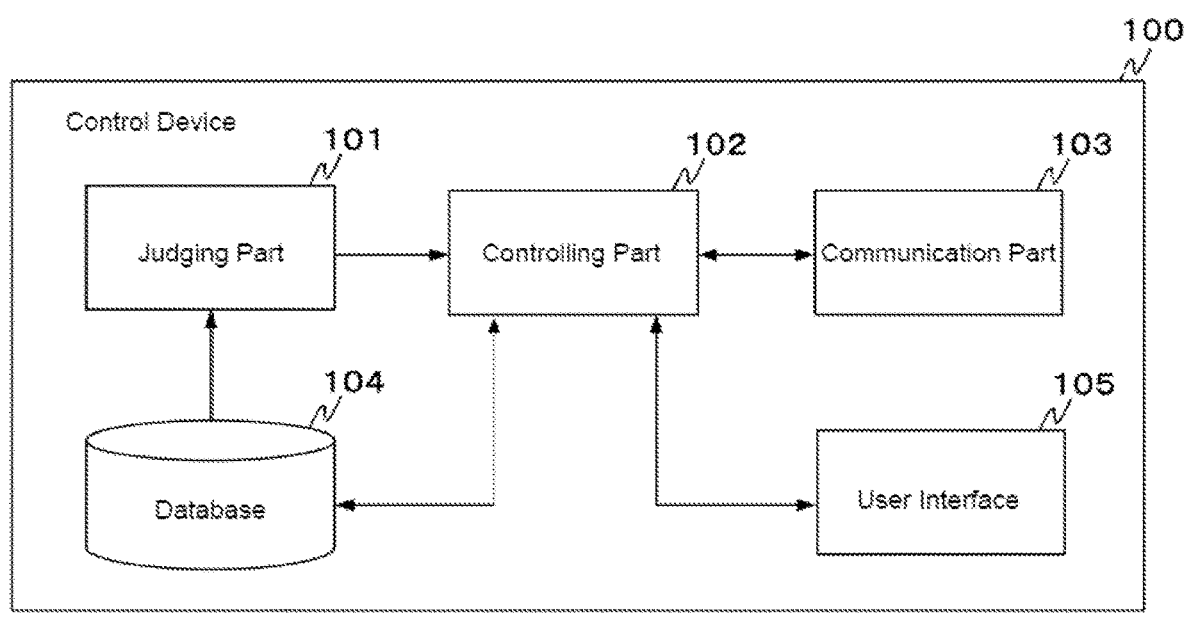
Figure 6:
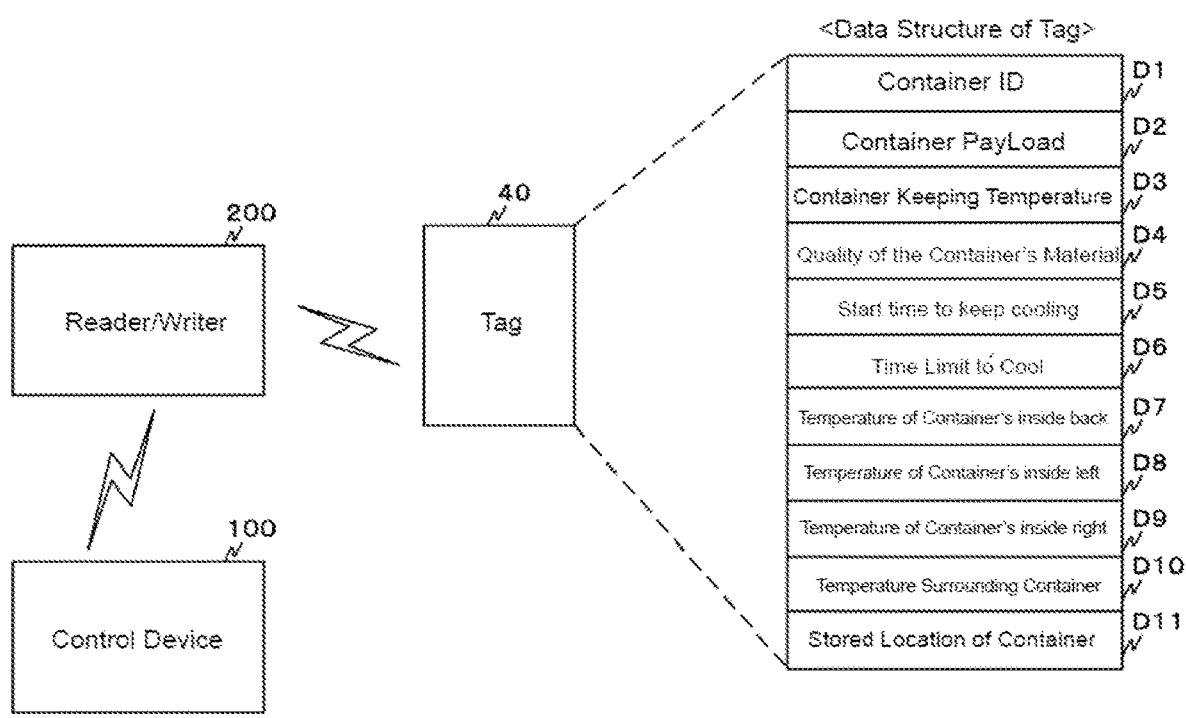
Figure 7:
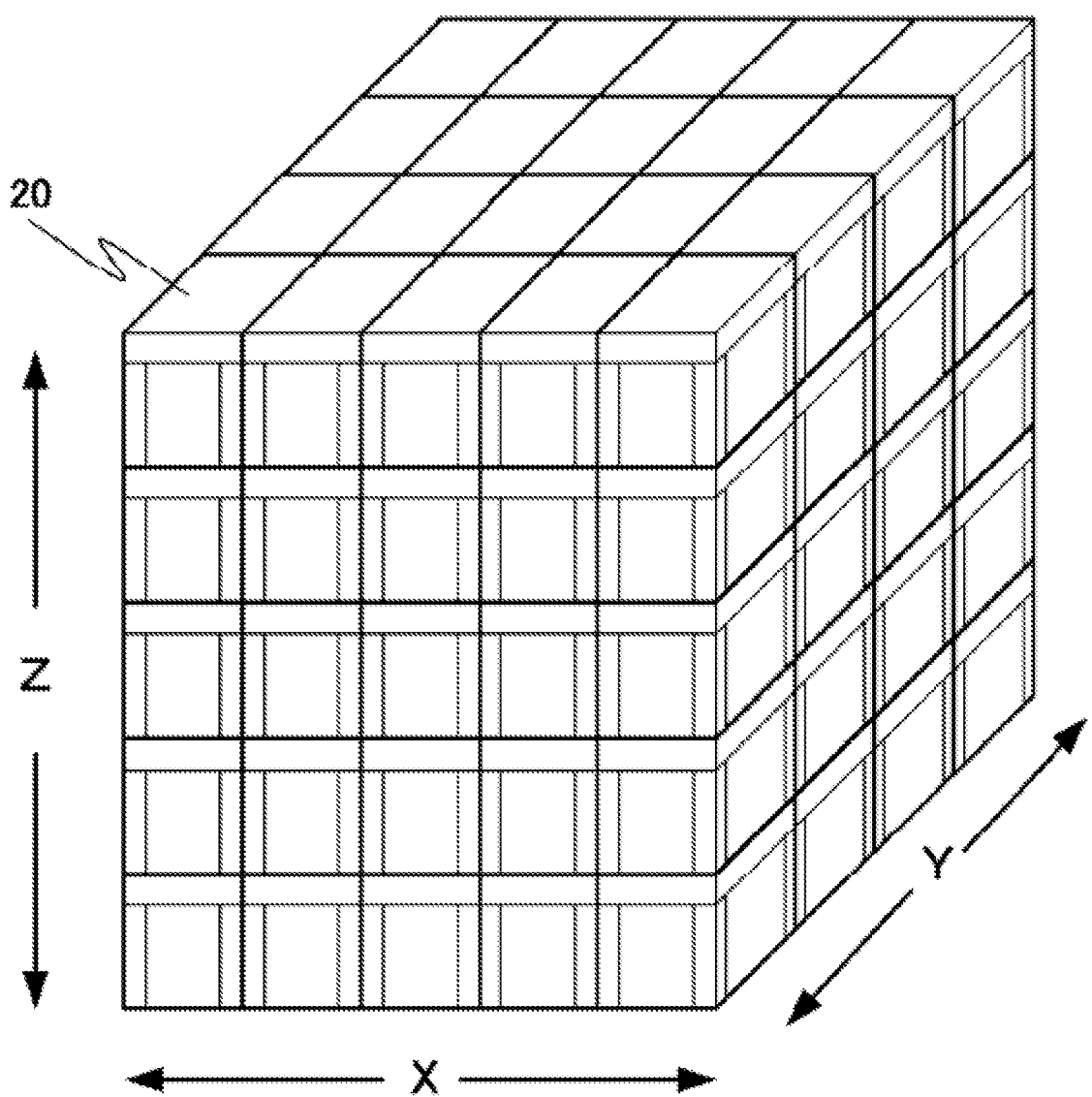
Figure 8:
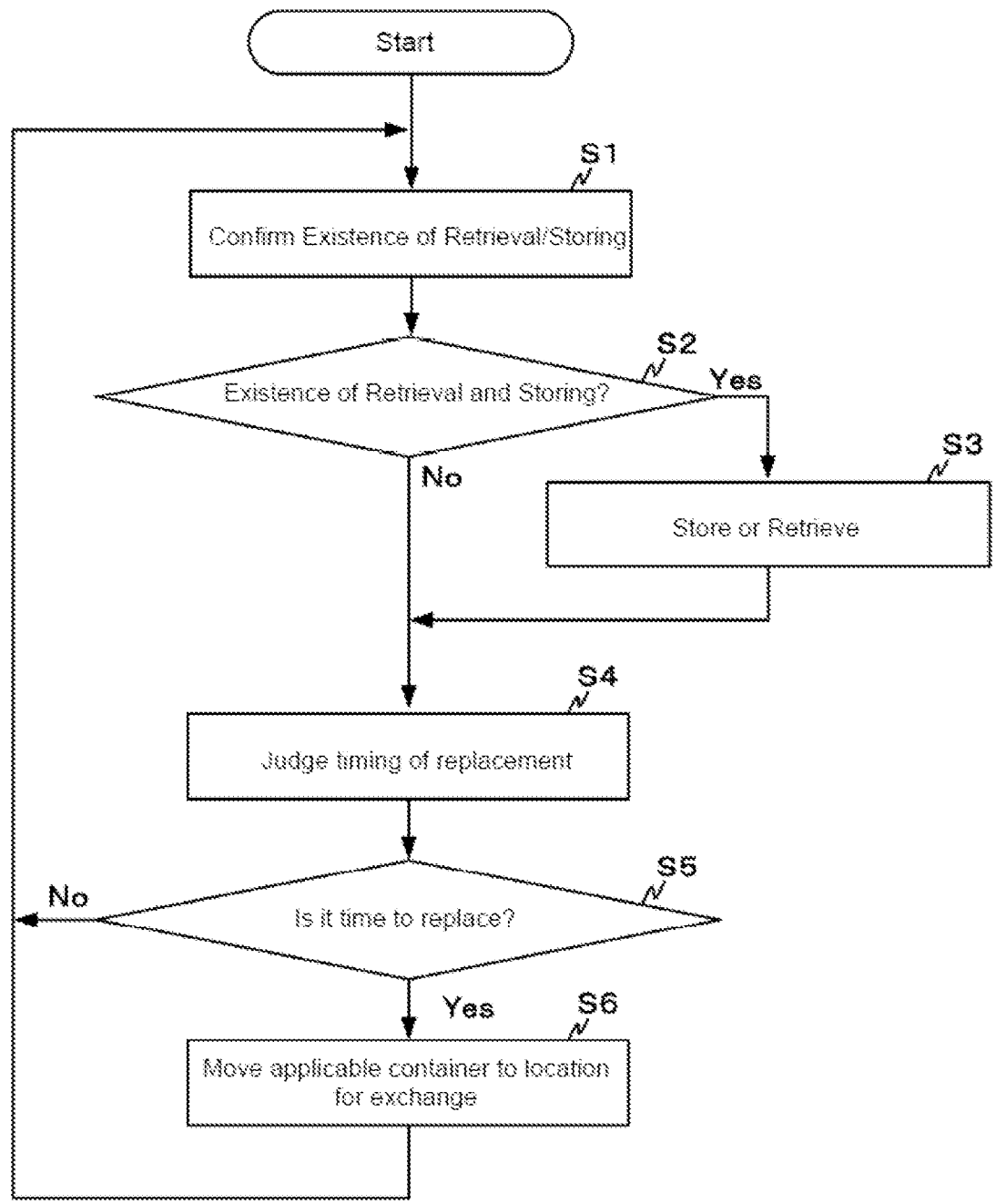
Figure 9:
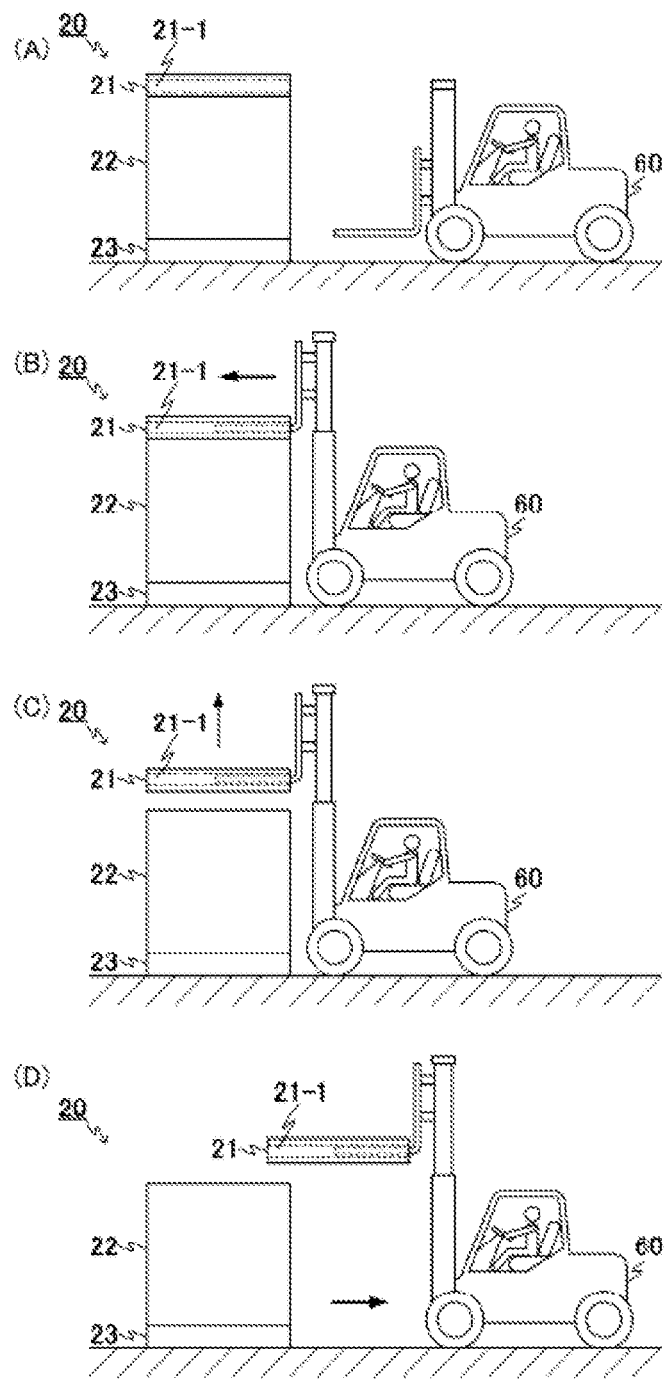
Figure 10:
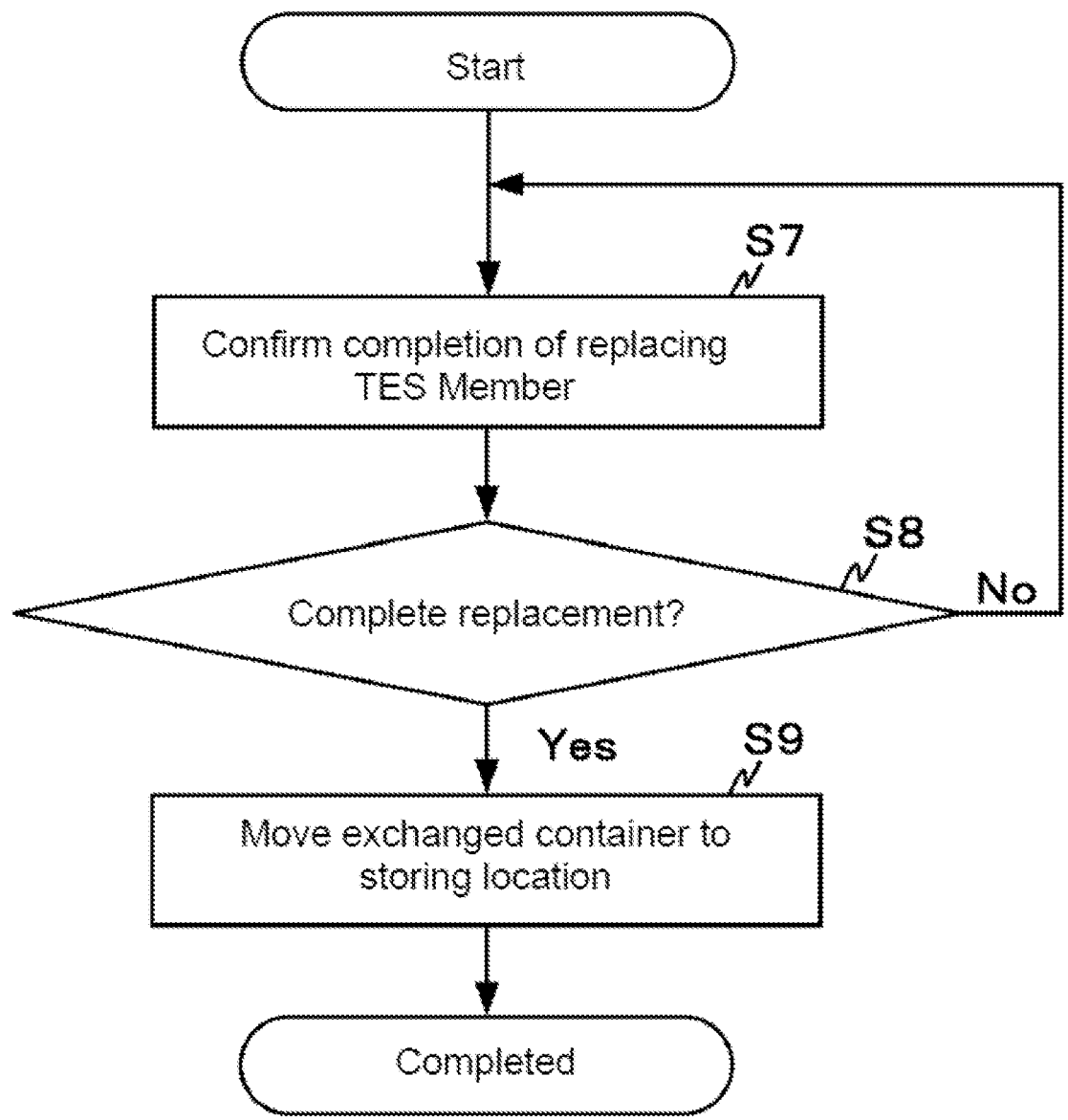
Figure 11:
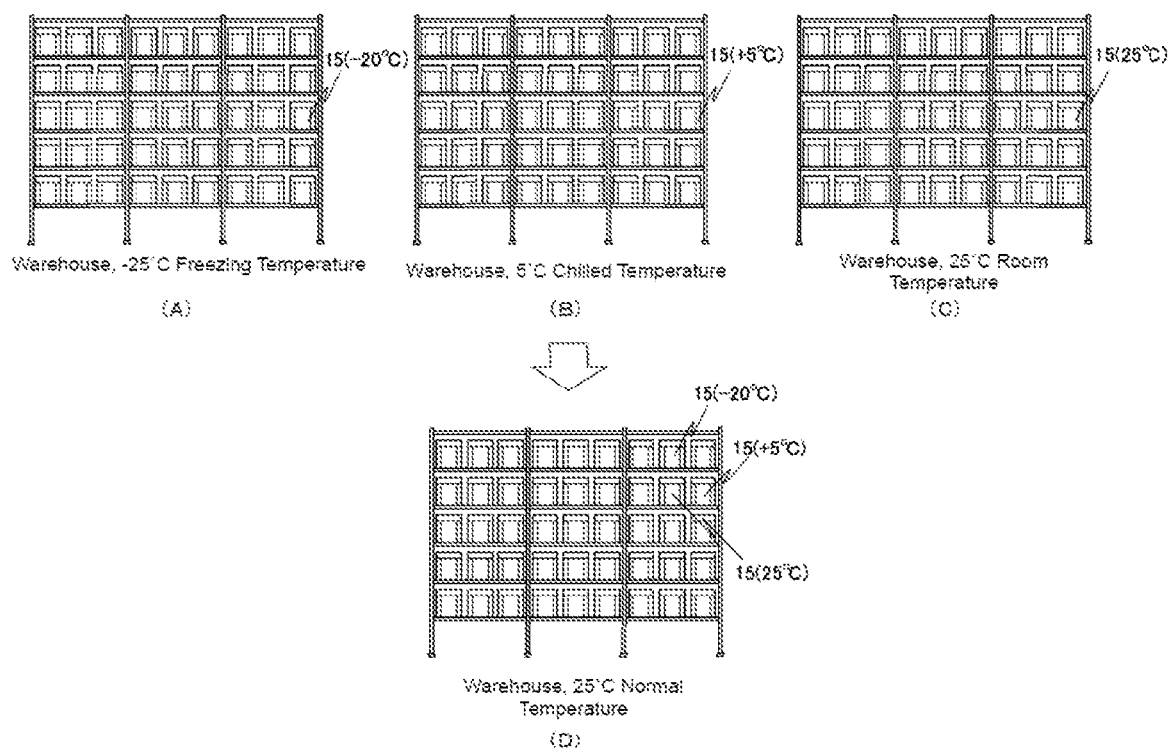
Figure 12:
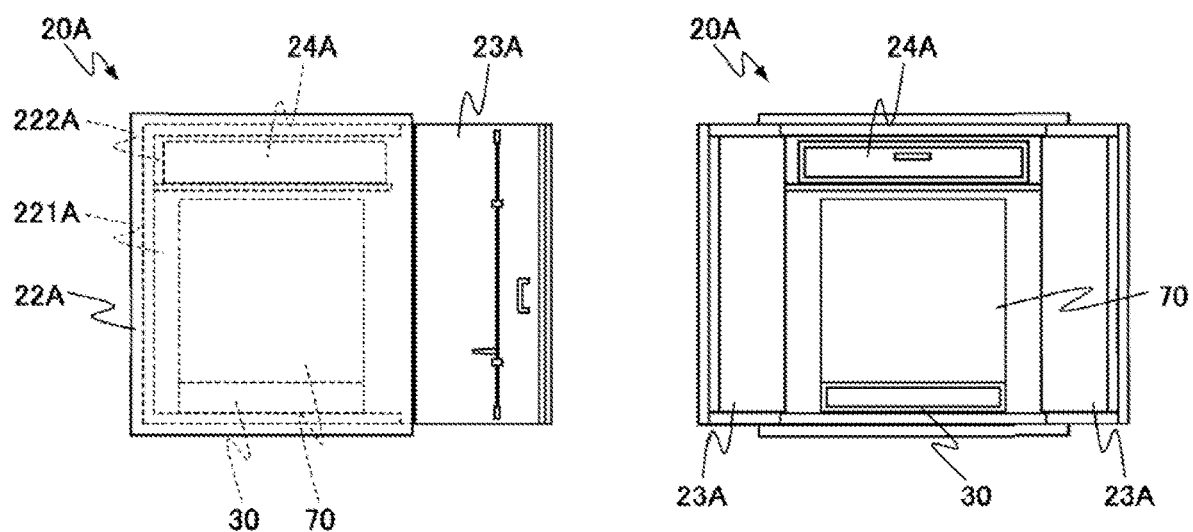
Figure 13:
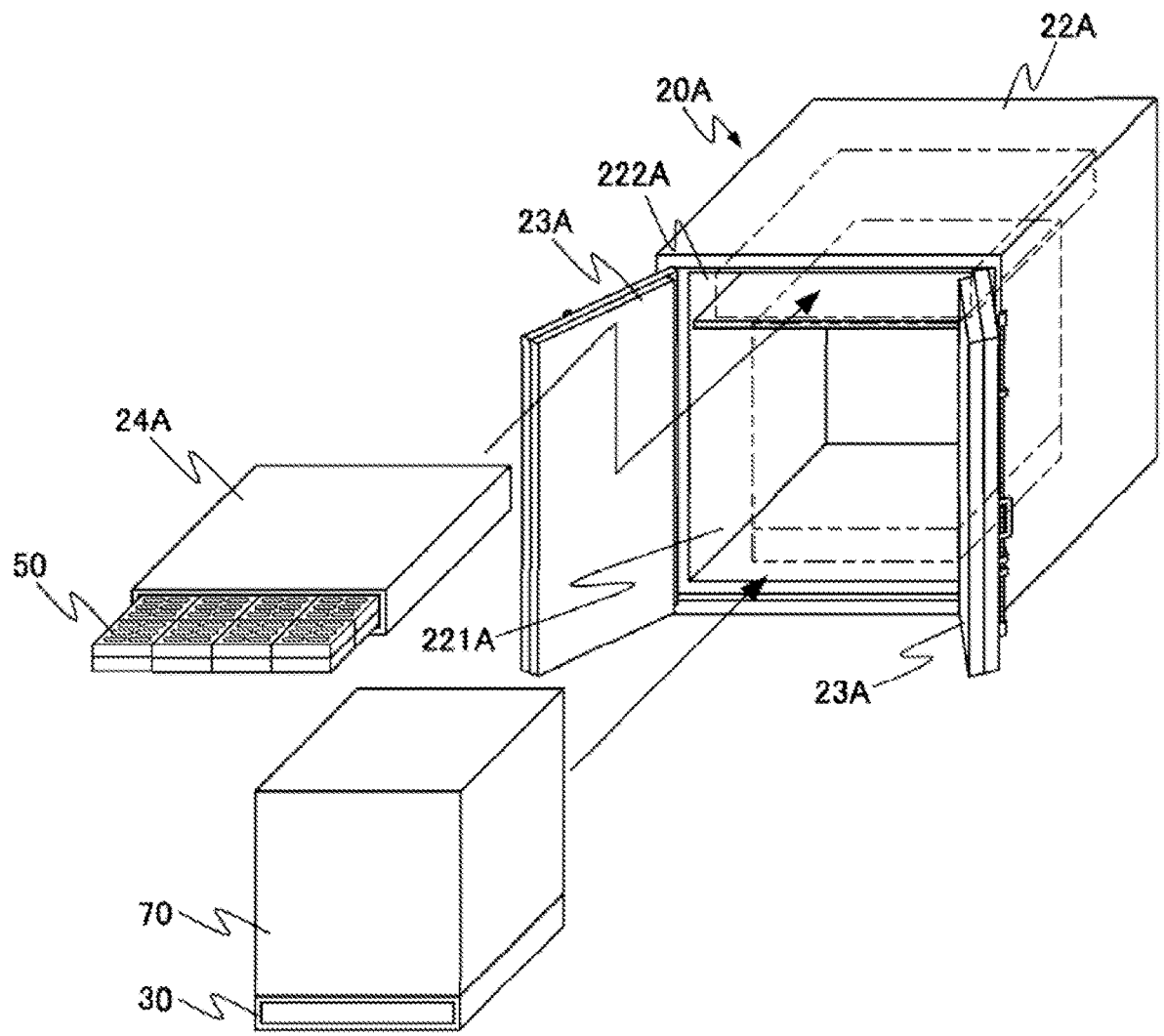
Figure 14:
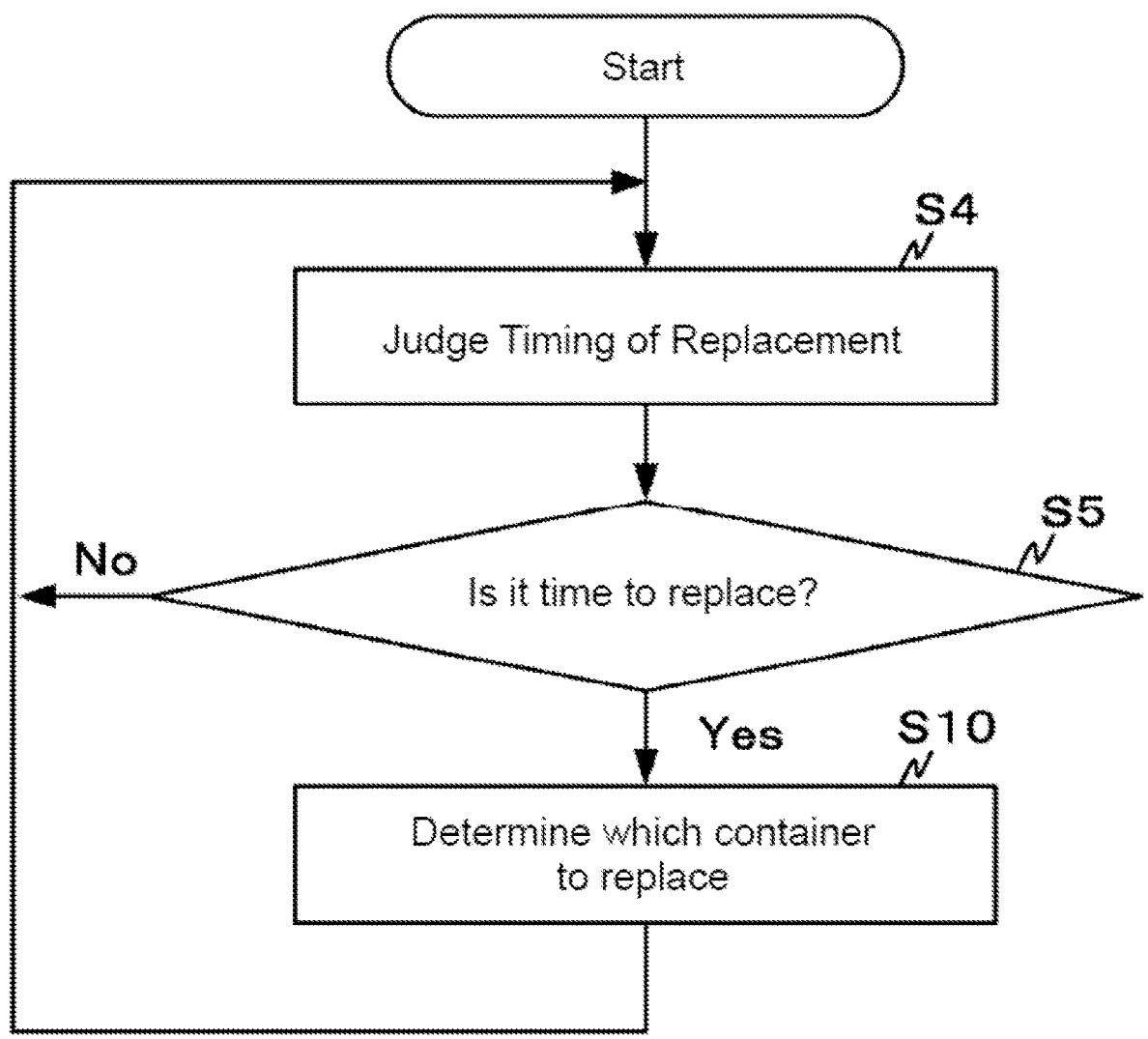

Drawing 3. Drawing shows relationship between lid member and TES substance in the embodiment of this invention.

Drawing 4. Drawing shows cross section of containers and pallet in the embodiment of this invention.

Drawing 5. Drawing shows functional block of control device in the embodiment of this invention.

Drawing 6. Drawing shows information recorded on tag in the embodiment of this invention.

Drawing 7. Drawing shows control method of containers in the embodiment of this invention.

Drawing 8. Flow chart shows action of control device for storage and retrieval and judging time to replace in the embodiment of this invention.

Drawing 9. Drawing shows relationship between lid member and forklift truck in the embodiment of this invention.

Drawing 10. Flow chart shows action of transfer control device on containers to storage space in the embodiment of this invention.

Drawing 11. Drawing shows effects which the embodiment of this invention perform.

Drawing 12. Side view drawing and front view drawing shows another example of container in the embodiment of this invention.

Drawing 13. Perspective view drawing shows state of storing a case, which stores cooled objects in containers shown in Drawing 12.

Drawing 14. Flow chart shows an alternative example of action shown in Drawing 8.

DETAILED DESCRIPTION

Next, the embodiment of this invention will be explained in detail as referring to Drawings.

EMBODIMENT 1

Drawing 1 shows a partial automatic warehouse as controlling subject of this embodiment. As referring to Drawing 1, this automatic warehouse has storage shelves 10, conveyor 11, stacker crane 12, guiding rails 13 and traveling, rails 14 are installed. And, each shelf of storage shelves 10 has boxes 15 stored.

A box 15 consists of container 20 which stored a cooled object and a pallet 30 to hold a container 20. In this embodiment, stores cooled objects and TES member 50 filled with TES substance are stored in a container and TES member 50 cools a cooled object. At this point, cooled objects would be as examples, ice, ice cream, frozen food, chilled food, fresh food, medicine and so on. The detail of TES member 50 and tangible configuration of containers 20 and pallet 30 will be described later. Therefore, drawing 1 simply shows simplified drawing of containers 20 and pallet 30 as boxes 15. And, storage shelves 10 store multiple boxes 15 but, as a matter of convenience for drawing, only one of boxes 15 on storage shelves 10 is indexed.

Conveyor 11 is for transferring boxes 15 for storing to and retrieving from automatic warehouse. Conveyor 11 conveys boxes 15 to where stacker crane 12 can reach, once boxes 15 enters the automatic warehouse. And, conveyor 11 also conveys boxes 15, from the automatic warehouse to retrieval location. More, conveyor 11 can be installed on both side of storage shelves and one of conveyor 11 is for storing and another conveyor 11 may be for retrieving.

stacker crane 12 is a crane which can transfer horizontally along with guiding rail 13 and traveling rail 14 by traveling mechanism, that is installed on traveling rail 14 with straddling, driving. These guiding rails 13 and traveling rail 14 are installed depending on transferring direction and transferring range of stacker crane 12.

Stacker crane 12 is equipped with platform 12-1 to hold a box 15. Platform 12-1 is configured to move up and down in perpendicular direction along with a pair of raising mast that is equipped on traveling mechanism. Platform 12-1 has sliding fork, which is configured to be able to extend and retract toward storage shelves 10 horizontally. Stacker crane 12 extends fork and insert fork into fork insert part which is a hole for forks on boxes 15. Then, stacker crane 12 scoops boxes 15 while forks are inserted in the fork insert part on pallet 30, with platform 12-1 move up and down then conveys to withdraw and deposit boxes 15 from storage shelves 10.

Stacker crane 12 achieves these actions by a motor driving traveling mechanism and platform 12-1 and controlling part that controls the motor. This controlling part executes these controls in response to instruction from control device 100 described later. Basically, instruction by control device 100 described later determines which boxes 15 shall be taken out or in any location of storage shelves 10. Then, stacker crane 12 stores boxes 15 to the location in response to instruction by control device 100 store location or unload boxes 15 which is at stored location where control device 100 instructed.

Next paragraphs explain detail configuration of containers 20 and pallet 30 referring to Drawing 2, Drawing 3 and Drawing 4.

At this point, Drawing 2 shows perspective view drawing on appearance of containers 20. Drawing 3 shows relationship of lid member 21 and TES member 50 included in containers 20. Drawing 4 shows cross section drawing of containers 20 shown in Drawing 2 and Drawing 3.

As referring to Drawing 2, containers 20 is equipped with container body 22 and lid member 21.

Container body 22 is configured as upper side being open and hollow rectangular parallelepiped shape box with tabular member. A cooled object is stored in the container body 22. Furthermore, tag 40 is pasted on inside or outside of container body 22. This tag 40 is achieved with, e.g. RFID (radio frequency identifier). Tag 40 has a record of information of containers 20 to identify store location in storage shelves 10 and information to control TES member 50 stored in containers 20. If Tag 40 was achieved with passive type, it would be good since tag 40 would not require battery. Tangible contents of information recorded on tag 40 will be described later as referring to Drawing 6.

And, tabular lid member 21 is installed on upper part of container body 22. Lid member 21 is configured to be removable from container body 22 and when lid member 21 is removed from container body 22, upper side of container body 22 can be open. On the other hand, if lid member 21 is installed on container body 22, container body 22 can be sealed inside. Furthermore, container body 22 has doors, so called hinged double doors, to open and close, a user would open and close these door to store cooled objects in the container body 22 or retrieve from container body 22.

And, upper part of lid member 21 has fork insert part 21-1 to insert fork on forklift truck 60 described later (refer to Drawing 9). It is easy to remove lid member 21 from container body 22 with raising fork while fork of forklift truck 60 being inserted into said fork insert part 21-1. And, it is easy to put lid member 21 on container body 22 with lowering fork while fork being inserted in the same way as above.

Containers 20 is loaded on pallet 30. Then, said pallet 30 has fork insert part 30-1, which is holes to insert fork on platform 12-1 of stacker crane 12 described above and forklift truck 60, etc. Crane 12 or forklift truck 60 can transfer containers 20 loaded on pallet 30 together while loaded on pallet 30, with inserting fork in the fork insert part 30-1.

Next, as shown in Drawing 3, lid member 21 of containers 20 has hollow part in the TES part 21-2 which can store multiple TES member 50. More, as a matter of convenience of drawing, only one of multiple TES member 50 is indexed.

Like this way, cooled objects can be cooled by TES member 50 from installing lid member 21 on container body 22 while TES member 50 is stored in the TES part 21-2. And, TES member 50 stored in the TES part 21-2 can be replaced with another TES member 50. For instance, if temperature of stored TES member 50 increased as time passing by, cooled objects could be stored at specified temperature range by exchanging with another TES member 50 which is cooled. And, the TES member 50 can be reused from cooling again said TES member 50 which was replaced due to increase of temperature.

In further detail, as shown in Drawing 3, for instance, 16 sheets of TES member 50 is stored in TES part 21-2. 16 sheets of the TES member 50 cool inside of the container body 22. Each TES member 50 is formed into specified thickness of tabular. And, each TES member 50 is rectangle in planar view.

Each TES member 50 consists of TES substance filled in the hollow box shaped case. Said hollow box shaped case would be made of resin, for instance.

TES substance consists from, for instance, water with great latent heat of fusion being main constituent and adding cold substance (cool substance), gelling substance as needed, and adding core substance, coloring substance, preservative substance and so on as necessary.

melting temperature (fusing point) of TES substance can be set as needed with adjusting with type or amount of cold substance (cool substance). Concretely, TES substance stored is created to hold appropriate temperature to preserve cooled objects in container body 22 with setting melting temperature (fusing point) For instance, if cooled objects was refrigerated, TES substance would be crated to keep inside of container body 22 at around +5° C., for instance. On the other hand, if cooled objects were frozen, TES substance would be crated to keep inside of container body 22 at around −20° C., for instance. Not limited to temperature of these examples, cooled objects can be held at specified temperature.

TES substance becomes stable gel with appropriate viscosity by adding gelling substance in TES substance. TES substance in this embodiment is different from general keeping cool substance made from high water absorption resin but can hold any temperature with mixing sodium chloride and gelling substance. And, TES substance used in this embodiment is different from general keeping cool substance but consists from ingredient that can hold temperature in the container body 22 for long hours. That is, TES member 50 filled with TES substance in this embodiment is superior holding constant temperature for long hours to general keeping cool substance. As such TES member 50, for instance, Ice Battery (registered trademark) by ITE Incorporated Company can be used.

Next, structure inside of containers 20 will be explained as referring to cross section drawing of containers 20 in Drawing 4. As descried in Drawing 4(A), containers 20 stores insulated container 22-1 in the container body 22. insulated container 22-1 is smaller than container body 22 and is hollow rectangular parallelepiped shape box with upper side open.

inner space of insulated container 22-1 forms cool room 22-2 that can store cooled objects (abbreviating the drawing). Bottom board and side wall board on insulated container 22-1 consists of insulated tabular member with specified thickness. For instance, insulated member would be considered as member including foaming resin. It stably can keep cooling cooled objects stored in cool room 22-2 with insulated container 22-1 preventing temperature of outside atmosphere from transferring to inside of cool room 22-2.

Top of side wall board on insulated container 22-1 contacts on lower side surface of outer edge side on TES part 21-2 of lid member 21 so that cold air in TES part 21-2 would not flow into insulated container 22-1. And, upper surface of side wall board on insulated container 22-1 and upper surface of side wall board on container body 22 form supporting part to hold lid member 21 including TES part 21-2.

TES substance filled in TES member 50 stored in TES part 21-2 of lid member 21 changes phase from solid to liquid, as time passing by influenced by temperature outside, etc. Then, TES substance, this latent heat of fusion while changing phase from solid to liquid absorb heat from surrounding heat in the atmosphere. From this result, atmosphere around TES member 50 gets cooled. Cooled atmosphere as the way described drops, due to gravity, to inside of cool room then diffused. Therefore, inside of cool room 22-2 gets cooled.

More, shape of lid member 21 shows in Drawing 4(A) that upper side of outer where fork insert part 21-1 is higher than outer top surface of other part of lid member 21 and location where fork insert part 21-1 forms has convex shape. For regarding this point, as considering case that furthermore containers 20 will be loaded on containers 20, as shown in Drawing 4(B), height of outer upper surface on other than fork insert part 21-1 on lid member 21 may be the same height as outer upper surface of location where fork insert part 21-1 forms. Basically, outer upper surface of lid member 21 may be flat shape. In this way, weigh of containers 20 loaded furthermore on top of containers 20 would be dispersed on entire outer upper surface of lid member 21 instead of limiting to outer upper surface of on location where fork insert part 21-1 forms.

Next, control device 100, that controls such containers 20 stored TES member 50, will be explained as referring to functional block drawing in Drawing 5. More, said control device 100 is located at automatic warehouse that stores containers 20. However, Control device 100 may be installed outside of automatic warehouse if junction device, etc. that transmits communication can allow conveyor 11, stacker crane 12 and containers 20 communicate with tag 40, etc. pasted on.

As referring to Drawing 5, control device 100 is equipped with judging part 101, controlling part 102, communication part 103, database 104 and user interface 105.

Judging part 101 is to judge if, based on information stored in database 104, time to replace TES member 50 stored in each container 20 has come or not. Judgment by judging part 101 is done periodically or irregularly. Judging part 101 notifies to controlling part 102 information to identify containers 20 stored TES member 50 that requires to be replaced if time to replace any TES member 50 has come based on result of judgment.

controlling part 102 is to control entire control device 100. Moreover, controlling part 102 controls action of stacker crane 12 and conveyor 11 via communication part 103, based on information recorded on database 104 and judging result by judging part 101. And other than that, controlling part 102 communicate with tag 40 pasted on containers 20 via communication part 103 to obtain information from tag 40 or write information on tag 40. Furthermore, controlling part 102, via user interface 105, outputs information to user or receive operation from user. Furthermore, controlling part 102, along with these processes, appropriately reads information from database 104 or appropriately stores information in database 104.

More, controlling part 102 and judging part 101 operates process while operation process device such as CPU, etc. equipped in control device 100 is deploying specific process in this embodiment to run software to RAM (Random Access Memory), etc., based on result of these operation process, controls each hardware equipped with control device 100 and achieves. said software is stored in outer memory device, for instance, database 104 and control device 100.

Communication part 103 is for controlling part 102 to communicate with tag 40 pasted on stacker crane 12, conveyor 11, and containers 20, etc. Communication by communication part 103 may be wired or wireless or both of them. For instance, wireless communication with tag 40 and wired communication with stacker crane 12 and conveyor 11 can be done. And, junction device can be used in these communications. And, multiple communication part 103 that follows multiple different communication standard may be prepared in response to transmission destination.

database 104 is memory device to record each type of information that is used by judging part 101 and controlling part 102, e.g. achieved by HDD (Hard disk drive). Each type of information recorded by database 104 is appropriately rewrite by controlling part 102 and is appropriately read by controlling part 102 and judging part 101.

User interface 105 is to output information to user and to receive operation by user. At this point, output of information is, e.g. to display information to screen. And, operation to receive is, for instance, instruction regarding storage and retrieval of containers 20. User interface 105 is achieved with, for instance, display part of liquid crystal display, and input device such as mouse and keyboard.

Next, as the assumption of tangible explanation on control method of control device 100, information recorded on tag 40 pasted on containers 20 will be explained as referring to Drawing 6 and Drawing 7. At this point, Drawing 6 shows data structure of information recorded on tag 40. And, drawing 7 shows control of location of containers 20 stored on storage shelves 10.

As referring to Drawing 6, on tag 40 pasted on containers 20 (abbreviated in the drawing), each type of information is recorded from Data D1 to Data D11 as data. These data are configured to read and write by e.g. control device 100. Therefore, reader/writer 200 of tag 40 shall be installed on storage shelves 10 stored containers 20. At this point, with considering available communication range of tag 40, reader/writer 200 shall be installed at intervals that allow all the tag 40 to communicate. And, these reader/writers 200 should be able to communicate with control device 100 via Wi-Fi, etc. Then, these reader/writers 200 should send and receive information to read from tag 40 or information to write on tag 40 to and from control device 100. From this, control device 100 can read and write, each data. And, in case that available range of communication of tag 40 is wide, control device 100 may directly communicate with tag 40 to read and write information. In any case, control device 100 display, information that has been read, on user interface 105 and store the information in database 104. And, control device 100 write information, that is received from user interface 105 in response to input operation, on tag 40.

And, each data may be read or written by other devices than control device 100 installed at where a cooled object is stored in a container 20 or where TES member 50 is stored in a container 20 and other reader/writer 200.

At this point, Data D1 is to describe container ID to show identifier of container 20 that this tag 40 pasted on.

Data D2 is equivalent to payload that is recorded regarding information of containers 20 with this tag 40. Although there is no especial limit of information to record in the payload as Data D2, for instance, it would be convenient to record general information used in automatic warehouse such as information that describes content of cooled objects stored in containers 20, manufactured date of cooled objects or expiration date of cooled objects, etc.

Data D3 is to show what degree of temperature containers 20 with this tag 40 should be held. Data D3 can be temperature or band of temperature or information of classification such as e.g. room temperature, refrigeration or freezing to identify temperature or temperature band. In this embodiment, these 3 classifications exist and if it was room temperature, it would keep no cooling with using TES member 50, if it was refrigeration, it would keep cool at +5° C. with using TES member 50 or if it was freezing, it would keep cool at −20° C. with using TES member 50.

Data D4 is to show the quality of the material of the container 20 with this tag 40. For instance, information to identify relatively superior containers 20 which can hold constant temperature for long hours or containers 20 with relatively inferior function to keep constant temperature. On the other, the information can be to identify size, etc. of containers 20.

Data D5 shows time when current TES member 50 stored in the container 20 with this tag 40 started to cool.

Data D6 shows time limit when current TES member 50 stored in the container 20 with this tag 40 stops cooling a cooled object at appropriate temperature. Calculating method of time limit recorded on Data D6 will be described later. More, time limit may be written, when a container 20 is deposited, by control device 100 or for instance, other device may write time limit where TES member 50 is exchanged, and so on. At this point, calculating method of time limit will be explained. As explained of Data D3, in this embodiment, temperature to keep cooling is determined depending on type of TES member 50. For instance, if it was refrigeration, TES member 50 would be utilized so that it would become +5° C.

Then, the number of sheets of TES member 50 determines length of time by time limit. For instance, if 16 sheets of TES member 50 stored in lid member 21, time limit would be after 24 hours when TES member 50 started to keep cooling. For another instance, if 72 sheets of TES member 50 was stored in lid member 21, time limit would be after 128 hours since TES member 50 started to keep cooling. And, even though a TES member 50 were supposed to make same +5° C., time limit could be different depending on type of TES member 50. As considering these facts, a table, which shows length of duration of cooling cooled object by TES member 50 at allowed temperature, per combination of allowed preserving temperature while a cooled object was preserved, performance of said TES member 50 and TES member 50 shall be prepared in this embodiment. Therefore, length of available cooling hours of cooled objects at allowed preserving temperature by TES member 50 would be measured regarding each of these combinations previously, while truly keeping cool, with having experience of measuring temperature of containers 20. Then measured result shall be stored as a table in the database 104.

Judging part 101 extracts time limit in corresponding to the number of sheets and the type of TES member 50 from table and would judge time to replace TES member 50 has come if limit time passed by from point when recorded as Data D5. More, every automatic warehouse may determine previously the number of sheets and the type of TES member 50 or every container 20 may be different. If every container 20 was different, it would be better to record the number of sheets and the type of TES member 50 on e.g. Data D2 so that judging part 101 can refer to said data.

More, calculating time limit, other factors may be considered. For instance, it would be better if limit time was adjusted, based on the quality of the material of containers 20 recorded as Data D4 and outdoor temperature described later recorded as Data D10. And, with considering error due to environment, time limit may be set e.g. 90% of length of possible cooling hours on cooled objects by TES member 50, at truly allowed preserving temperature.

Data D7 shows temperature on back side of inside of containers 20 with this tag 40. At this point, back side means back side in case that inserted surface is considered as front side while forklift is inserting fork in pallet 30 in case of loading a container 20 on pallet 30.

Data D8 shows temperature on left side of inside of containers 20 with this tag 40. At this point, left side means left side in case that inserted surface is considered as front side while forklift is inserting fork in pallet 30 in case of loading a container 20 on pallet 30.

Data D9 shows temperature on right side of inside of containers 20 with this tag 40. At this point, right side means right side in case that inserted surface is considered as front side while forklift is inserting fork in pallet 30 in case of loading a container 20 on pallet 30.

Data D10 shows temperature surrounding container 20 with tag 40.

Data D7, Data D8, Data D9 and Data D10 would be better to be measured by tag 40. Therefore tag 40 with function of measured temperature is used as tag 40. Then, radio wave that reader allocated nearby tag 40 send is used as energy source and tag 40 measure temperature then send measured temperature to reader. reader send received measured temperature to control device 100 and writer. Then, writer writes measured temperature received on tag 40 to be able to update current temperature on Data D7, Data D8, Data D9 and Data D10. And, control device 100 can grasp outside temperature in the containers 20 and surrounding containers 20. And, tags 40 are pasted at each location to measure each temperature in corresponding to Data D7, Data D8, Data D9 and Data D10 in order to achieve such a configuration. For instance, tag 40 is pasted on back side of inside of containers 20 to measure temperature in corresponding to Data D7. Tags 40 are pasted on each location to measure temperature on Data D8, and Data D9 likewise in corresponding temperature in the container 20. And, Data D10 is likewise, tag 40 is pasted paste on outside of container 20 to measure corresponding temperature.

Data D11 is to show data where containers 20 with this tag 40 or these containers 20 loaded on pallet 30 is stored on storage shelves 10. Here, in this embodiment, control of storage space will be explained referring to Drawing 7. More, Drawing 7 schematically shows relationship of location of containers 20 stored on storage shelves 10 in automatic warehouse and storage shelves 10 and pallet 30, etc. are abbreviated in the drawing. And, only one of containers 20 among multiple containers 20 is indexed.

In this embodiment, storage shelves 10 as shown in Drawing 1 exist in multiple number of row. Threat, in this embodiment, stored location of containers 20 is controlled with (X, Y, Z) 3 axis's. For instance, flat surface in case of confronting directly the edge of storage shelves 10 in multiple number of row is as X-axis and, depth is as Y-axis, height is as Z-axis. Here, control device 100 based on current storing situation and specified algorithmic program may determine or an operation in response to user may determine which location of shelves 10 to store containers 20 and pallet 30.

The above from Data D1 to Data D11 were explained. At this point, tag 40 doesn't need to record all of these data, for instance, Data D3 or from Data D7 to Data D10 may not be recorded.

Next, action of control device 100 will be explained as referring to Drawing 8, Drawing 9 and Drawing 10. Here, Drawing 8 shows flow chart of action regarding storage and retrieval of containers 20 and to judge replacement timing for TES member 50. And, Drawing 9 shows replacement of TES member 50. Furthermore, Drawing 10 shows flow chart of action on replacement of TES member 50.

At first, controlling part 102 of Control device 100 confirms existence of storage and retrieval of containers 20 (step S1). For instance, it would be judged as storage existed when sensor, etc. may detect containers 20 is placed on conveyor 11 or user interface 105 instructed to store (Yes at step S2). And, on the other, it would be judged as retrieval existed when user interface 105 instructed to retrieve (step S2). In this case, proceed to step S3. On the other hand, in case of no storage and retrieval, (No at step S2), proceed to step S4.

At step S3, based on judged result from step S2, controlling part 102 of control device 100 processes storage and retrieval of containers 20. For instance, if storing process, database 104 stores information read from tag 40 on containers 20. And, controlling part 102 controlling stacker crane 12 and conveyor 11 then stores containers 20 to the storing location where read data D11 described. More, if storing location was instructed by user interface 105, controlling part 102 would store containers 20 to the specified store location by controlling stacker crane 12 and conveyor 11. And, record specified store location on Data D11 of tag 40 and database 104. In case of retrieval, controlling part 102 search database 104, based on containers ID of container 20 instructed to retrieve, to identify the location of the container 20. Then, controlling part 102 controls stacker crane 12 and conveyor 11 to retrieve containers 20 from identified stored location. And, database 104 updates as no containers 20 being stored on storing location of retrieved container 20.

Next, at step S4, judging part 101 of control device 100 judges if time to replace TES member 50 has come or not on each container currently stored in automatic warehouse. Then, judging part 101 notify judged result to controlling part 102 (step S4). Judging result includes container 20 with time to replace having come or not and additionally includes container ID of container 20 if time to replace has come. Judging method is described above and judging part 101 extracts time limit according to the number of sheets and the type of TES member 50 from table and judges time to replace TES member 50 having come if extracted length of time limit has pass by from time recorded as Data D5 started to cool.

controlling part 102, if judged result notified as no container 20 with time to replace exists, go back to step S1 (No at step S5) then continue process. On the other hand, controlling part 102, if judged result notified as container 20 with time to replace exists, go to step S6 (No at step S5).

At step S6, controlling part 102 search database 104 based on container ID of container 20 notified as time to replace from judging part 101 at step S4 and identify the stored location of container 20. Then, controlling part 102 controls stacker crane 12 and conveyor 11 and moves container 20 stored at specified location to where to replace TES member 50 stored in container 20 (step S6).

In automatic warehouse controlled by control device 100, if time to replace TES member 50 stored in container 20 had come, the action explained above with referring to Drawing 8 would have container 20 moved to where to exchange TES member 50.

Next, replacement of TES member 50 will be explained as referring to Drawing 9. Container 20 with TES member 50 whose time has come to replace is transferred to where to exchange TES member 50 by process of step S6. At transferred location, forks on forklift truck 60 are inserted to fork insert part 21-1 on pallet 30 and containers 20 can be unload from conveyor 11.

Here, TES member 50 is heavy in this embodiment, especially if many sheets such as 96 sheets, etc. were stored in containers 20, weight of both lid member 21 and TES member 50 on container 20 becomes tens of kilograms. Thereat, lid member 21 on containers 20 has fork insert part 21-1 described above.

Then, forklift truck 60 is utilized not limited to unload from conveyor 11 but to exchange lid member 21, as shown in Drawing 9(A) at location to exchange TES member 50 where container 20 was transferred to at step S6. Concretely, as shown in Drawing 9(B), forks on forklift truck 60 inserts fork insert part 21-1 on lid member 21. Then, as shown in Drawing 9(C) raise forks. Therefore, lid member 21 can be separated from container body 22 of containers 20. At these state, as shown in Drawing 9(D), forklift truck 60 can be transferred. Then, a user replaces TES member 50 stored in lid member 21 with frozen new TES member 50 at location where lid member 21 was transferred. After replacement, from proceeding reversed sequence from (A) to (D) described above, lid member 21 stored new TES member 50 can be combined with container body 22 of container 20 at its original state.

As this way, lid member 21 due to storing TES member 50 can be removed easily. And, since user does not need to touch container body 22 of containers 20, it would prevent temperature on container body 22 of containers 20 from raising up.

Then, after lid member 21 stored new TES member 50 and container body 22 of containers 20 are combined, forks on forklift truck 60 are inserted into fork insert part 30-1 of pallet 30 and then containers 20 are put back to conveyor 11.

On the other hand, regarding action of control device 100 will be explained as referring to flow chart in Drawing 10. Controlling part 102 of control device 100 confirms if TES member 50 replacement has been completed or not (step S7). It will repeat to confirm until TES member 50 is replaced (No at step S7, step S8).

For instance, if containers Id of containers 20 subject to replace IFS member 50 was confirmed with reading tag 40 of container 20 on conveyor 11 or if user interface 105 was received completion of operation to replace TES member 50, replacement of would be judged as replacement completed. (Yes at step S8). In this case, proceed to step S9.

At step S9, controlling part 102 reads tag 40 of containers 20 whose TES member 50 has been replaced, controls stacker crane 12 and conveyor 11 and store containers 20 to location that is storing location described as Data D11. And, controlling part 102 rewrite keeping cool started time, that is stored as Data D5 of tag 40 on containers 20 whose TES member 50 has been replaced to current time. Furthermore, information stored in database 104 in corresponding to Data D5 is changed to current time.

action explained above as referring to Drawing 10 can put containers 20 whose TES member 50 has been replaced to the original stored location.

The effects in this embodiment explained above will be explained as referring to Drawing 11. It was necessary to adjust temperature of entire warehouse at automatic warehouse in the past in response to cooled objects in containers 20. For instance, if cooled objects needed to be frozen, an entire warehouse would be required to be cooled at e.g. −20° C. as shown in Drawing 11(A). And for instance, if cooled objects needed to be refrigerated, an entire warehouse would be required to be cooled at e.g. 5° C. as shown in Drawing 11(B). Therefore, there were issues such as consumption of electricity was great or cooling facility or condensation, etc. may cause breakdown of conveyor 11 or maintenance cost on stacker crane 12 may be great. And things to control at different temperature, such as, for instance, things to be frozen, things to be refrigerated and things controlled at room temperature as shown in Drawing 11(A), (B) and (C), & it was necessary to prepare multiple automatic warehouse for each temperature. Then, for instance, in case that things to be frozen are many and they do not fit in freezing automatic warehouse, things to be frozen cannot be transferred to warehouse at room temperature. it was difficult to utilize multiple warehouse effectively.

However, in this embodiment, as shown in Drawing 11(D), even if containers 20 with different controlled temperature were mixed, one automatic warehouse can control them. And, temperature at automatic warehouse can be kept at room temperature. Basically, warehouse without air conditioned facility for freezing or refrigeration can keep cooled objects. And, even if warehouse with air conditioned facility for freezing or refrigeration, cooled objects can be kept cool without the air-conditioned facility running. Therefore, this embodiment can solve issues in the past.

EMBODIMENT 2

Next, the second embodiment will be explained. More, explanation of part that is common with the first embodiment will be abbreviated.

At the first embodiment, Data D7, Data D8 and Data D9 recorded on tag 40 were not needed to use. Therefore, these data on tag 40 was explained no record necessary. And, these data were not recorded on tag 40 so that tag 40 did not need to have function to measuring temperature.

However, this embodiment, judging part 101 of control device 100 judges with using at least one of these Data D7, Data D8 or Data D9. Therefore, in this embodiment, at least one of tag 40 pated on containers 20 requires having function to measure temperature then at least one of any Data D7, Data D8 or Data D9 is updated every specified period.

Then, controlling part 102 of control device 100 receives, via reader/writer 200 or from tag 40 directly, updated Data D7, Data D8 or Data D9. Then, based on received data, temperature of each containers 20 recorded on database 104 will be updated.

In this embodiment, judging part 101 judges with using temperature of said each container 20 at step S4.

This point will be explained. In the first embodiment, judging part 101 extracted time limit from table in corresponding to the number of sheets and the type of TES member 50 at step S4 and judged time to replace TES member 50 if time limit as Data D5 passed by since keeping cool started.

In this embodiment, in addition to this method, judging part 101 at step S4 refers to temperature of each containers 20 and if it finds temperature is not appropriate to cool cooled objects, it would judge time to replace TES member 50 has come. Basically, judging part 101 judges from points of two views. From this method, in this embodiment, so called double check can be done.

Therefore, if judging method had error in the first embodiment and temperature of TES member 50 rose quicker than expected rate by the judging method in first embodiment, time to replace TES member 50 could be judged. And, on the other hand, if temperature sensor was malfunction, etc. so that temperature cannot be measured, the judging method in the first embodiment can judge time to replace TES member 50.

More, control device 100 described above can be achieved with, hardware, software or these combinations. And, control method done by control device 100 described above can be achieved with hardware, software or these combinations. Here, achieved with software means, computer read program and execute it then achieve it.

program is stored with using various type of non-transitory computer readable medium and can be provided to computer. Non-transitory computer readable media includes various type of tangible storage medium. Examples of non-transitory computer readable media are magnetic record media (for instance, flexible disc, magnetic tape, hard disc drive), photo magnetic record media (for instance, photo magnetic disc), CD-ROM (Read Only Memory), CD-R, CD-R/W, semiconductor memory (for instance, mask ROM, PROM (Programmable ROM), EPROM (Erasable PROM), flash ROM, RAM (random access memory)) are included.

And, although each embodiment described above is ideal embodiment for this invention, range of this invention is not limited to each embodiment described above, each factors of configuration in each embodiment described above can be combined in not deviating range from purport this invention. And, Moreover, various modified configuration can be done in not deviating range of purport of this invention.

For instance, in each embodiment described above, containers 20 consists of container body 22 with open upper part and detachable lid member 21 at upper part of the container body 2 and the lid member 21 consists of TES member 50 and TES part 21-2 but not limited to this configuration. That is, as shown in Drawing 12 and Drawing 13, containers 20A can consists of container body 22A, which has cooled part storing part 221A and space to store TES member 222A above this cooled part with open front side, double hinged door 23A, which is installed at front open part of this container 22A, and drawer of TES member 24A, which can be stored in space for TES 222A.

In this case, size (for instance, volume 1000 L~1500 L) of container body 22 should be able to store whole storing case 70, that includes cooled object, with pallet 30, which loads storing case 70, as shown in Drawing 12 and Drawing 13. From doing this, operation that is to unload cooled object once from stored storing case 70 then to repack to a containers 20 before taking cooled objects to automatic warehouse where control system is applicable in each embodiment described above, would be eliminated. Therefore, storing case 70 and pallet 30 that is used at existing automatic warehouse can be stored in the containers 20A, as is so that without lowering workability, automatic warehouse that control system of each embodiment described above applied, can be adopted.

And, other, from changing action described above each embodiment, even though it is not other than automatic warehouse, each embodiment described above can be utilized. The examples of modified action will be called "the alternative examples" and explained as follows.

Like explained as referring to Drawing 8, in each embodiment described above, in case of being notified containers 20 with time to replace TES member 50 exists (No at step S5), proceeded to step S6. Then, at step S6, controlling part 102 controlled stacker crane 12 and conveyor 11 to transferred containers 20 with expired TES member 50 to where TES member 50 is exchanged.

However, these alternative shows, controlling part 102, instead of transferring containers 20, notify a user a container 20 with expired TES member 50 exists.

Therefore, control device 100, in addition to each functional block shown in Drawing 5, furthermore notifying part is equipped. Said notifying part can be achieved with, for instance, displays, etc. to show notifying content or warning or output to make sound to notify or beep sound, such as speaker, etc. Or, instead of having notifying part, communication part 103 may communicate to instruct another device to notify.

Next, action of control device 100 equipped with these notifying methods will be explained as referring to Drawing 14.

In this alternative example, since controlling part 102 does not need to control transferring container 20, steps from step S1 to step S3 are abbreviated, at first, step S4 will be executed. Concretely, judging part 101 judges if each container 20 stored in current automatic warehouse has expired TES member 50 or not. Then, judging part 101 notifies controlling part 102 judged result (step S4).

If notified judged result was no expired containers 20, (No at step S5), controlling part 102 would go back to step S4 then continue process. On the other hand, if notified judged result was expired containers 20 exists (No at step S5), controlling part 102 would go to step S10 instead of step S6.

Then, at step S10, notify a user containers 20 with expired TES member 50 exists. This notification is described above such as displaying screen or audible output. And, both of these notification may be used. For instance, tangible location of containers 20 stored expired TES member 50 is displayed on screen and voice to notify this tangible location is output mechanically or tangible location is shown only on screen and only beep sound may be output.

A user can know expired TES member 50 exists and its location from hearing or seeing notification with referring to content of said notification time to replace. From this method, there is an effects that user does not need to control, expired TES member 50 and user can go to location with expired TES member 50 to replace keeping cool member 50 easily.

In addition to, according to this alternative, control device 100 does not need to control stacker crane 12 nor conveyor 11. And, control device 100 can be used at location other than automatic warehouse.

And, notification in this alternative example, controlling stacker crane 12 or conveyor 11 is not excluded. Basically, while notifying like this alternative example, with proceeding from step S1 to step S3, then step S6, containers 20 can be controlled to transfer in automatic warehouse ⌒ transfer along with notification. For instance, in case of blackout or breakdown, etc. at automatic warehouse, if stacker crane 12 or conveyor 11 was not allowed to use, as long as control device 100 was available, it could notify. For instance, if emergency power supply was limited so that stacker crane 12 or conveyor 11 cannot be supplied power but as long as control device 100 has power supply, it could notify.

More, in this alternative example, explanation containers 20A explained above as referring to Drawing 12 and Drawing 13 may be utilized.

DESCRIPTION OF THE INDEXES 10 storage shelves
11 conveyor
12 stacker crane
12-1 platform
13 guiding rail
14 traveling rail
15 boxes
20,20A containers
21 lid member 21-1 fork insert part
21-2 TES part
22, 22A container body
22-1 insulated container
22-2 cool room
23A door
24A TES member storing container
30 pallet
30-1 fork insert part
40 tag
50 TES member
60 forklift truck
100 Control device
101 judging part
102 controlling part
103 communication part
104 database
105 user interface
200 reader-writer
D1, D2, D3, D4, D5, D6, D7, D8, D9, D10, D11 data
221A cooled part storing part
222A TES member storing part

SUMMARY

It controls to cool cooled objects and to keep cooled objects cool without cooling an entire storage space for cooled objects.

The control system of containers, which hold cooled objects and TES member to cool said cooled objects, keeping cool. equips judging method to judge time to replace said TES has come or not based on combination of cooled objects, which was stored in the said containers to keep cool, and TES member and notifying method to notify time to replace TES member when said judging method judges time to replace TES member come.

DRAWING

[Drawing 1]
[Drawing 2]
[Drawing 3]
[Drawing 4]
[Drawing 5]
control device 100
judging part 101
controlling part 102
communication part 103
database 104
user interface 105
   [Drawing 6]
reader/writer 200
control device 100
tag 40
<data structure of tag>
container ID D1
container payload D2
container's keeping temperature D3
quality of the material of the container D4
starting time to keep cooling D5
time limit to cool D6
temperature on back side of inside of containers D7
temperature on left side of inside of containers D8
temperature on right side of inside of containers D9
temperature surrounding container D10
stored location of container D11

[Drawing 7]
[Drawing 8]
Start
Confirm existence of retrieval and storing
Existence of retrieval and storing?
Store or retrieve
Judge timing of replacement
Time of replacement has come?
Move applicable container to location for exchange
   [Drawing 9]
   [Drawing 10]
Start
Confirm completion of replacing TES member S7
Completed to replace? S8
Move exchanged container to storing location S9
Completed
   [Drawing 11]
Warehouse freezing room
Warehouse room temperature
   [Drawing 12]
   [Drawing 13]
   [Drawing 14]
Start
Judge timing of replacement S4
Time to replace has come? S5
Detect container whose time to replace has come S10

What is claimed is:

1. A control system for a container including a first member that stores objects and a second member including a TES (Thermal Energy Storage) member to keep the objects at an allowed preserving temperature, where a lower face of the second member is positioned above an upper face of the first member in a sealed state of the container,
   the control system configured to determine a length of time to keep the objects at the allowed preserving temperature via the TES member based on the objects,
   the control system configured to judge whether to replace the TES member based on an indication of performance, expiration and time elapsed since including the TES member in the second member of the container via wirelessly retrieved recorded information located on a tag associated with, and outside of, the container, and
   the control system configured to wirelessly notify the replacement of the TES member due to the judging step.

2. The control system, described in claim 1, wherein the judging step includes keeping the container equipped with the tag for receiving the recorded information.

3. The control system, described in claim 1, wherein the tag includes recorded information to identify storage space for the container.

4. The control system, described in claim 1, wherein the first member and the second member are configured to be separated.

5. The control system, described in claim 1, wherein the second member includes an opening to insert a fork of a forklift to remove the second member in the sealed state.

6. The control system, described in claim 1, wherein the first member comprises an outer wall and an insulated wall, and wherein the insulated wall is shorter than the outer wall.

7. The control system, described in claim 6, wherein a lower edge of the second member is positioned above an upper edge of the insulated wall in the sealed state.

8. The control system, described in claim 5, wherein the TES member is located below the opening to insert the fork.

9. A control program including computer-executable instructions capable of being executed by a processor on a computer in a control system for a container an object in a first member of a container at an allowed preserving temperature via a Thermal Energy Storage (TES) member in a second member, the computer-executable instructions include:

determining a length of time to keep the object at the allowed preserving temperature via the TES member based on the object, judging whether to replace the TES member based on performance, expiration and time elapsed since including the TES member in the second member of the container via wirelessly retrieved recorded information located on a tag associated with, and outside of, the container, wirelessly notifying the replacement of the TES member, and causing, via the wireless notification, removal of the TES member, where the second member is positioned above an upper face of the first member in a sealed state of the container.

\* \* \* \* \*